US007507955B2

(12) United States Patent
Crawford et al.

(10) Patent No.: US 7,507,955 B2
(45) Date of Patent: Mar. 24, 2009

(54) MASS SPECTROMETER MULTIPOLE DEVICE

(75) Inventors: Robert K. Crawford, Palo Alto, CA (US); James L. Bertsch, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 365 days.

(21) Appl. No.: 11/395,026

(22) Filed: Mar. 31, 2006

(65) Prior Publication Data

US 2006/0169890 A1 Aug. 3, 2006

Related U.S. Application Data

(63) Continuation of application No. 10/956,585, filed on Oct. 1, 2004, now Pat. No. 7,064,322.

(51) Int. Cl.
*B01D 59/44* (2006.01)
*H01J 49/40* (2006.01)

(52) U.S. Cl. .................. 250/292; 250/290; 250/492.21; 250/282; 250/288; 250/281; 250/386 R; 250/423 R

(58) Field of Classification Search ................. 250/290, 250/492.21, 292, 282, 288, 281, 396 R, 286, 250/423 R
See application file for complete search history.

(56) References Cited

U.S. PATENT DOCUMENTS

| | | | |
|---|---|---|---|
| 3,693,002 A | 9/1972 | Espy | |
| 3,699,330 A | 10/1972 | McGinnis | |
| 3,953,732 A | 4/1976 | Oron et al. | |
| 4,013,887 A | 3/1977 | Fite | |
| 4,686,365 A | 8/1987 | Meek et al. | |
| 4,814,613 A | 3/1989 | Fite et al. | |
| 4,849,675 A | 7/1989 | Miller | |
| 4,937,456 A | 6/1990 | Grim et al. | |
| 5,412,207 A | 5/1995 | Micco et al. | |
| 5,847,386 A | 12/1998 | Thomson et al. | |
| 6,107,626 A | 8/2000 | Wang et al. | |
| 6,111,250 A | 8/2000 | Thomson et al. | |
| 6,153,880 A | 11/2000 | Russ, IV et al. | |
| 6,417,511 B1 | 7/2002 | Russ, IV et al. | |
| 6,570,153 B1 | 5/2003 | Li et al. | |
| 6,624,410 B1 | 9/2003 | Voss | |
| 6,646,258 B2 | 11/2003 | Russ, IV | |
| 6,723,986 B2 | 4/2004 | Kernan et al. | |
| 7,064,322 B2 * | 6/2006 | Crawford et al. | 250/290 |
| 7,067,802 B1 * | 6/2006 | Kovtoun | 250/282 |
| 2004/0011956 A1 | 1/2004 | Londry et al. | |

OTHER PUBLICATIONS

Schaffer et al., An Ion Funnel Interface for Improved Ion Focusing and Sensitivity Using Electrospray Ionization Mass Spectrometry, Anal. Chem., 1998, vol. 70, pp. 4111-4119.
Franzen et al., Electrical Ion Guides, ASMS, 1996, p. 1170.

* cited by examiner

*Primary Examiner*—Jack I Berman
*Assistant Examiner*—Meenakshi S Sahu

(57) ABSTRACT

The invention provides a multipole device for a mass spectrometer system. In general, the multipole device contains a plurality of conductive rods each comprising a conductive layer, a resistive layer, and an insulative layer between the conductive and resistive layers. The invention finds use in a variety of applications, including ion transport, ion fragmentation and ion mass filtration. Accordingly, the invention may be employed in a variety of mass spectrometer systems.

23 Claims, 6 Drawing Sheets

MASS SPECTROMETER MULTIPOLE DEVICE

REFERENCE TO CO-PENDING APPLICATION(s)

This application is a continuation of application Ser. No. 10/956,585, filed Oct. 1, 2004 now U.S. Pat. No. 7,064,322, the entire disclosure of which is hereby incorporated by reference.

BACKGROUND

Mass spectrometry is an analytical methodology used for quantitative elemental analysis of samples. Molecules in a sample are ionized and separated by a spectrometer based on their respective masses. The separated analyte ions are then detected and a mass spectrum of the sample is produced. The mass spectrum provides information about the masses and in some cases the quantities of the various analyte particles that make up the sample. In particular, mass spectrometry can be used to determine the molecular weights of molecules and molecular fragments within an analyte. Additionally, mass spectrometry can identify components within the analyte based on a fragmentation pattern.

Analyte ions for analysis by mass spectrometry may be produced by any of a variety of ionization systems. For example, Atmospheric Pressure Matrix Assisted Laser Desorption Ionization (AP-MALDI), Field Asymmetric Ion Mobility Spectrometry (FAIMS), Atmospheric Pressure Ionization (API), Electrospray Ionization (ESI), Atmospheric Pressure Chemical Ionization (APCI) and Inductively Coupled Plasma (ICP) systems may be employed to produce ions in a mass spectrometry system. Many of these systems generate ions at or near atmospheric pressure (760 Torr). Once generated, the analyte ions must be introduced or sampled into a mass spectrometer. Typically, the interior portions of a mass spectrometer are maintained at high vacuum levels ($<10^{-4}$ Torr) or even ultra-high vacuum levels ($<10^{-7}$ Torr). In practice, sampling the ions requires transporting the analyte ions in the form of a narrowly confined ion beam from the ion source to the high vacuum mass spectrometer chamber by way of one or more intermediate vacuum chambers. Each of the intermediate vacuum chambers is maintained at a vacuum level between that of the proceeding and following chambers. Therefore, the ion beam transports the analyte ions transitions in a stepwise manner from the pressure levels associated with ion formation to those of the mass spectrometer.

In most applications, it is desirable to transport ions through each of the various chambers of a mass spectrometer system without significant ion loss. Ion transport is usually accomplished using an ion guide that moves ions in a defined direction in a narrow beam. Ion guides typically utilize electromagnetic fields to confine the ions radially (x and y) while allowing or promoting ion transport axially (z).

Ion guides also employ repellent inhomogeneous radio frequency (RF) fields to create electric pseudo-potential wells to confine the analyte ions as they travel through the guide, and a voltage potential between the input and output ends of the device to move ions through the guide. However, prior art devices are prone to "RF droop" (i.e., areas of reduced RF) if high resistance multipole rods are used. As such, in many ion guides ions may become stalled (and/or filtered) as they are transported through the guide.

Thus, there is still a need for ion guides that efficiently transport ions without significant ion loss or power dissipation.

SUMMARY OF THE INVENTION

The invention provides a multipole device for a mass spectrometer system. In general, the multipole device comprises a plurality of conductive rods each comprising: a conductive layer, a resistive layer; and an insulative layer disposed between the conductive layer and the resistive layer. The device confine and transport ions on an axis in a uniform RF field. In certain embodiments, the rods are electrically connected so as to provide a direct current electric field gradient along the axis for moving the ions along the axis and a radio frequency field that confines the ions to the central axis. The invention finds use in a variety of applications, including ion transport, ion fragmentation and in mass filters.

DEFINITIONS

Figure 1:
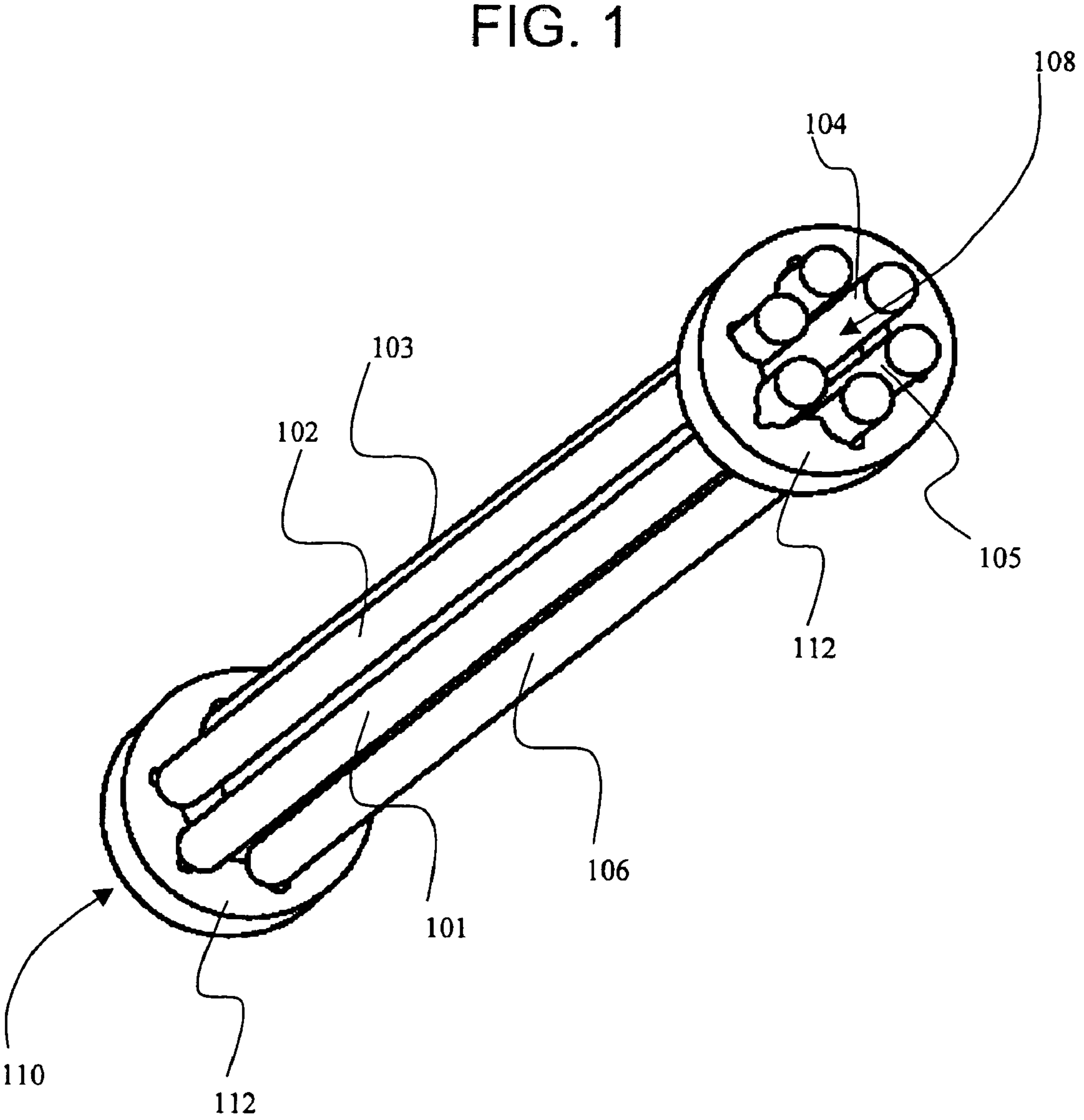
FIG. 1 is a schematic representation of an exemplary hexapole ion guide.

Unless defined otherwise, all technical and scientific terms used herein have the same meaning as commonly understood by one of ordinary skill in the art to which this invention belongs. Still, certain elements are defined below for the sake of clarity and ease of reference.

The term "rod" is used herein to describe a composition that may have any cross-sectional shape.

The term "multipole device" is used herein to encompass quadrupole, hexapole, octopole, and decapole devices (or similar devices containing other numbers of rods), regardless of how those devices may be employed in a mass spectrometer system (e.g., for ion transport, ion fragmentation, or as a mass filter, etc).

In describing the rods of the invention, the terms "inner" and "outer" are used. These terms are relative terms and are used to indicate the relative proximity of an element to the outside surface of a rod. An "inner element" should not be interpreted to mean that the element is solely contained in the inner core of a rod, although this may be the case. Likewise, an "outer" element need not be on the surface of a rod, although this may be the case. Further, an "inner" element of a rod, an "outer" element of a rod, or any element therebetween, need not extend around the entire rod.

An element that is present as a "layer" in a rod may be a central core of a rod.

A "plurality" is 2 or more.

The term "RF droop" refers to a phenomenon that occurs in multipole ion guides. The term "RF droop" refers to a reduction in an RF field, causing trapping of ions and or mass discrimination of ions as they travel down the guide.

Ions transported in a "uniform RF field" are transported in an RF field that has a consistent RF magnitude. A uniform RF field usually does not contain regions of reduced RF magitude.

DETAILED DESCRIPTION OF THE INVENTION

The invention provides a multipole device for a mass spectrometer system. In general, the multipole device comprises a plurality of conductive rods each comprising: a conductive layer; a resistive layer; and an insulative layer disposed between the conductive layer and the resistive layer. The device confine and transport ions on an axis in a uniform RF field. In certain embodiments, the rods are electrically connected so as to provide a direct current electric field gradient along the axis for moving the ions along the axis and a radio frequency field that confines the ions to the central axis. The invention finds use in a variety of applications, including ion transport, ion fragmentation and in mass filters.

Methods recited herein may be carried out in any logically possible order, as well as the recited order of events. Furthermore, where a range of values is provided, it is understood that every intervening value, between the upper and lower limit of that range and any other stated or intervening value in that stated range is encompassed within the invention.

The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Mass Spectrometry Systems

Figure 5:
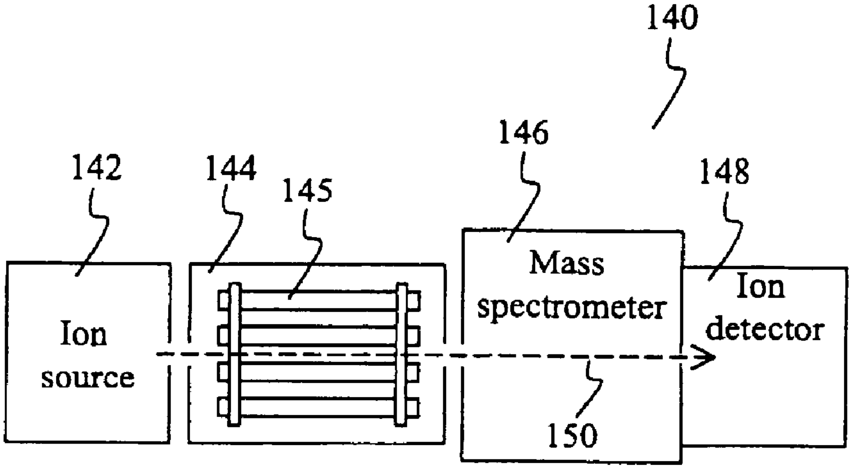
FIG. 5 is a schematic representation of a first exemplary mass spectrometry system employing the multipole ion guide.

The invention provides a mass spectrometry system containing: an ion source, a multipole device that will be described in greater detail below, and an ion detector. An exemplary mass spectrometer system 140 employing a multipole device of the present invention is illustrated in FIG. 5. The mass spectrometer system 140 comprises an ion source 142, chamber 144 (which may be one of two or more pressure transition chambers) containing the multipole device 145, a conventional mass spectrometer 146, and an ion detection system 148. The mass spectrometer 146 can be any type of mass spectrometer including but not limited to a time-of-flight instrument, a FTMS or a magnetic sector spectrometer, all of which are well known in the art. In many embodiments, chamber 144 is one or more pressure transition stages that lie between an ion source 142 that is at or near atmospheric pressure and a mass spectrometer 146 that is usually at high vacuum. The multipole device may be employed as a multipole ion guide 145 in chamber 144 to transport the ions in a well collimated beam from the ion source 142 to the mass spectrometer 146. In certain cases, chamber 144 contains two pressure transition stages that transition the pressure level from that of the ion source 142 to that of the mass spectrometer 146. The intermediate pressures in the pressure transition stages may be P1 and P2, respectively. For example, if the ion source 142 is operated at a pressure of 760 Torr, the pressure P1 inside the first pressure transition region may be much less that 760 Torr, for example at 0.1 Torr, and the pressure P2 inside the second pressure transition stage may be much less than pressure P1, for example P2 might be at 0.001 Torr. The pressure of the mass spectrometer 146 is much less than P2. In embodiments where two or more pressure transition chambers are used, the device may be employed in each chamber.

In use, an ion (the path of which is which is shown by arrow 150) produced in ion source 142 is moved through chamber 144 using the multipole ion guide 145 into mass spectrometer 146, where it is separated from other ions. The ion passes from mass spectrometer 146 to ion detector 148, where the ion is detected.

As mentioned above, chamber 144 may be a collision chamber. In mass spectrometer systems containing a collision chamber comprising the device, a neutral gas may be introduced into chamber 144 to facilitate fragmentation of ions as they move through the multipole device.

Figure 6:
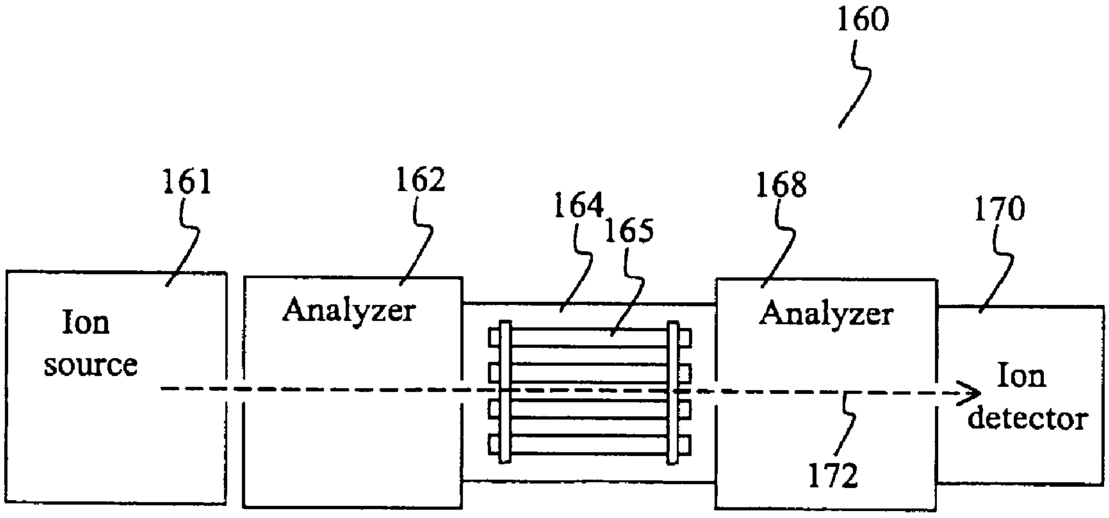
FIG. 6 is a schematic representation of a second exemplary mass spectrometry system employing the multipole ion guide.

An exemplary mass spectrometer system containing the multipole ion guide employed in a collision cell is schematically illustrated in FIG. 6. In this embodiment of the invention, the multipole ion guide may be used in place of conventional ion guides in a collision cell used in multiple mass/charge analysis systems known in the art as "triple quad" or simply, "QQQ" systems. FIG. 6 illustrates a triple quad system 160 of the present invention. The system 160 comprises three chambers 162, 164 and 168, an ion detection system 170 and an ion source 161. The first chamber 162 and third chamber 168 are relatively low pressure chamber and function as mass/charge analyzers. The second chamber 164, between chambers 162 and 168, contains a multipole ion guide 165 according to the present invention. In the second chamber 164, a gas such as Nitrogen ($N_2$) or Argon (Ar) is introduced at a pressure of about $10^{-1}$ to $10^{-4}$ Torr. The gas molecules collide with sufficiently energetic analyte ions as they move through the multipole device causing fragmentation and production of daughter ions. Chambers 162 and 168 can each be any mass/charge analyzer, including but not limited to a quadrupole mass filter, an ion trap, a time-of-flight instrument or a magnetic sector spectrometer. Although not illustrated, the mass spectrometer system 160 of the present invention may have more than three stages and the ion fragmentation chamber 164 may comprise more than one stage and still be within the scope of the present invention.

In one embodiment, a sample containing ions is passed from an ion source to a first analyzer 162 where a particular ion is filtered from other ions in the sample. The ion (the path of which is shown by arrow 172) is fragmented in collision cell 164 containing the multipole ion guide to produce daughter ions. The daughter ions are passed from chamber 164 to analyzer 168 where a particular daughter ion is filtered from other daughter ions. The filtered daughter ion is detected in ion detector 170.

In certain embodiments, the device may be present at the ion entrance or exit ends of a quadrupole mass analyzer (e.g., a quadrupole mass filter) and may assist in the transport of ions into or out of the analyzer.

Further, in addition to generating axial accelerating or decelerating fields in a multipole (e.g., quadrupole) mass filter, the invention may be employed in a mass filter to enhanced entrance optics by mimicking a Brubaker pre-filter lens. Employed in this embodiment, the first, last or both the first and last 3% to 25% of the rods of a multipole mass filter have the above-described insulative and resistive elements. At ends of the rod, the resistance layer overlaps onto the inner uncoated conductive element (e.g., a metal rod), picking up the U+ (or U− for the other rod pair). The other end of the rod end would have a DC connection point which would be held at less than the U+ value. To most closely mimic a Brubaker lens, DC at the other end may be about quad DC ground, the average of U+ and U−. An intermediate reduced DC voltage between U+ and U− may also be employed, and might have advantages in different embodiments. This embodiment creates a wide transmission entrance to a mass filter and provides most or all of the advantages of conventional Brubaker lenses, without the necessity of separate rods, capacitive couplers and extra insulating structure. In addition, there would be inherently superior optical alignment of instant lens or "prefilter", to the mass filter, there would be no mechanical discontinuity caused by a rod break, and the abrupt U+ (and U−) discontinuity normally present in prior art devices would be replaced by a ramping of voltage along the length of the resistance. With appropriate selection of thicknesses and materials for the insulative and resistive elements, the RF drop across the layers may be adjustable to be, for example, small or large. Thus, the RF on the entrance section can be adjusted to a smaller magnitude than that of the quadrupole RF if desired. As would be recognized by one of skill in the art, that depending on the length of the prefilter, it might be necessary to make the rods longer, perhaps by 4% to 25%, to maintain the same mass filter peak shape performance.

While the above embodiment describes a prefilter, a post filter could be constructed in the same manner, and a single mass filter with both a post filter and prefilter is also possible. Moreover, as should be evident to someone skilled in the art, prefilters and/or postfilters could be combined with axial accelerations over segments of the quadrupole or over its entire length. One must merely apply DC voltages to the appropriate points along the length of the rods. Using the term "DC voltage" should in general not preclude the use of time varying voltage levels, such a voltages that are adjusted as the mass of interest is changed or voltages which are stepped at an appropriate time to gate ions into an adjacent ion manipulation or measuring device.

Multipole Devices

The multipole device discussed briefly above may be employed to manipulate (for example, move, e.g., transport, fragment or filter), ions in a mass spectrometer system. In certain embodiments, the device operates to facilitate directional movement of ions through a chamber of a mass spectrometer system. The chamber may be a chamber of intermediate vacuum between a chamber at atmospheric pressure and a high vacuum chamber, or a collision chamber (otherwise known in the art as a collision cell), for example. The device may be used to transport ions, as well as to fragment ions (in the case where the device is used as a collision chamber). Accordingly, the device find particular use in single multipole ion guide mass spectrometry systems, e.g., "qTOF" systems, as well as tandem multipole ion guide mass spectrometry systems, e.g., "qqqTOF" systems. When the device is employed in a tandem multipole ion guide mass spectrometry system, the device may be employed as a collision cell. As discussed in greater detail below, a device may also be employed as an ion filter.

The multipole device contains a plurality of rods (i.e., 2 or more rods, typically an even number of rods, e.g., 4, 6, 8 or 10 or more), longitudinally arranged around a central axis along which ions are directionally moved (i.e., from one end of the central axis to the other end of the central axis) during operation of the device. A suitable arrangement of rods in an exemplary hexapole ion guide is shown in FIG. 1. In general the rods e.g., 101, 102, 103, 104, 105 and 106, of an ion guide are conductive, and are arranged to provide an input end 108 for accepting ions, an output end 110 for ejecting ions, and a central axis extending from the input end to the output end (not indicated in FIG. 1). In certain embodiments, the rods may be held in a suitable arrangement by one or more collars 112, although several alternatives to collars may be used. Viewed from the input end of the multipole device, the rods may be labeled in a clockwise manner (as exemplified in FIG. 1) to provide two sets of rods: rods that are even-numbered rods (e.g., rods 102, 104 and 106, for example) and rods that are odd-numbered rods (e.g., rods 101, 103 and 105, for example). In many embodiments, the longitudinal axes of the rods are parallel and equally distanced from the central axis. The spacing between consecutive rods is usually the same between all rods of a device, although rod spacing may vary between different devices. In use as an ion guide, the rods are electrically connected so as to provide a direct current (DC) electric field gradient along the central axis for moving ions along the central axis and a radio frequency (RF) field that confines the ions to a region proximal to the central axis.

The multipole device may have dimensions similar to that of other multipole device (e.g., multipole ion guides), and, as such, may vary greatly. In certain embodiments, the multipole device has an overall length of 4 cm to 40 cm, and has rods that define an inner passage having an inscribed diameter of 2 mm to 30 mm. Device having dimensions outside of these ranges are readily employed in certain systems, however. Depending on the materials used for fabrication and the dimensions desired, in certain embodiments a rod may be from 5 cm to 50 cm in length (e.g., 10-30 cm) and may have a diameter of 0.7 mm to 15 mm (e.g., 1 mm to 8 mm), although rods having dimensions outside of these ranges may be readily employed in certain systems.

In general, at least a portion of each of the rods of a multipole device according to the invention described herein contains three coaxially arranged elements, each element with a distinct electrical property. These elements and their electrical connections within the multipole ion guide will be described in greater detail below.

In describing the rods, the terms "inner" and "outer" are used. These terms are relative terms and are used to indicate the relative proximity of an element to the outside surface of a rod. As exemplified in FIGS. 2A and 2B, an inner element is situated inside the rod whereas an outer element is situated proximal to or at the outside surface of the rod. As will be described in greater detail below, an inner element may represent a central core of a rod (see, e.g., element 8 of FIG. 2A), or a layer present upon the central core of a rod (see, e.g., element 8 of FIG. 2B, wherein the central core is element 12). Accordingly, an "inner element" should not be interpreted to mean that the element is solely contained in the inner core of a rod, although this may be the case. Further, it is noted that the term "rod" is used herein to describe a composition that may have any cross-sectional shape, e.g., a cross sectional shape that is circular, oval, semi-circular, concave, flat, square, rectangular, hyperbolic, or multisided. The figures show rods having a circular cross sectional shape solely to exemplify the invention. The rods could have different cross-sectional shapes.

Further and as described below, it is noted that the insulative and resistive elements need not surround the entire rod and may only present in part of a rod that is proximal to (or on the side closest to) the passageway through which ions travel. In these embodiments, relative terms such as "inner" and "outer" refer to the part of the rod (e.g., a radius of a rod) that contains those elements. It is also noted that nowhere is it required that the entire length of the rod contains insulative and resistive elements. Accordingly, in any of the embodiments described below (and especially in particular embodiments) the rod may contain insulative and resistive elements along at least part of its length (including, but not necessarily, the entire length of the rod). The portion of the length of a rod that has the insulative and resistive elements may be at the beginning, end, or in the middle of the rod.

Figure 2A:
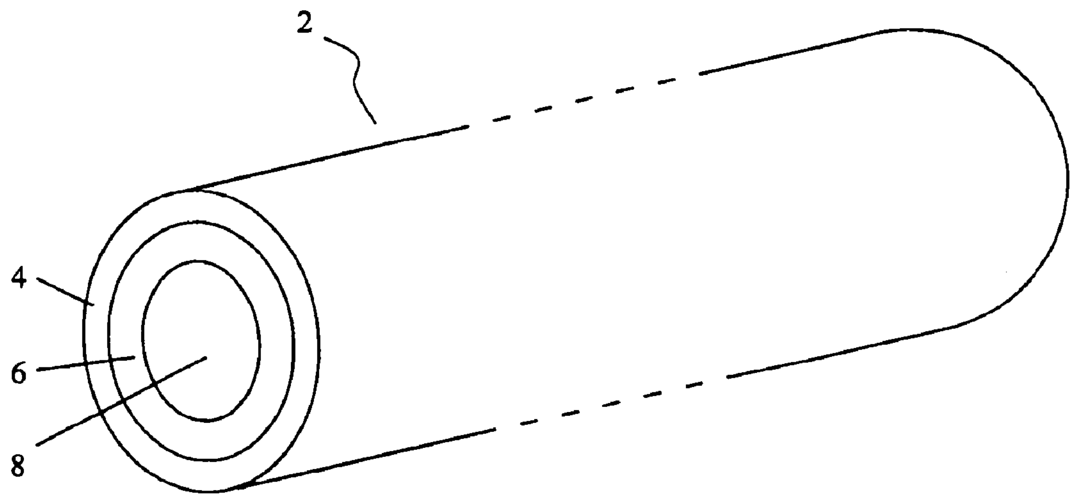
FIGS. 2A and 2B are schematic views of two exemplary representative multipole ion guide rods of the invention.
Figure 2B:
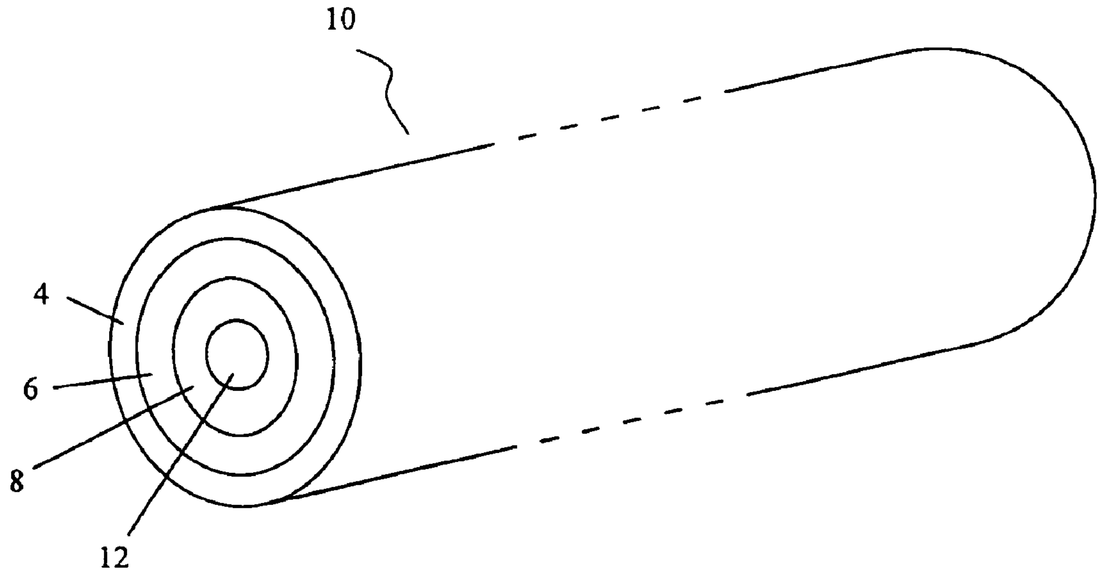

With the above definitions in mind and with reference to FIGS. 2A and 2B, each of the rods of the multipole device may be described as containing an inner conductive element 8, an outer resistive element 4, and an insulative element 6 between the inner element 8 and outer element 4. The elements are coaxially arranged along the length of each rod to provide a rod that can be thought of as a coaxial capacitor containing a resistive outer coating. As discussed above, in certain embodiments the inner element 8 may be centrally located in the rod (as shown in rod 2 of FIG. 2A) or present as a layer upon a central core of the rod (as shown in rod 10 of FIG. 2B).

In general, all of the materials contained within the rod should be vacuum compatible, e.g., they should be materials that do not out-gas in a vacuum, and may be chosen accordingly.

Conductive element 8 is generally a highly conductive material (e.g., a material having a conductivity of between 3 k and 680 k siemens per centimeter, for example from 17 k to 330 k siemens per centimeter. As will be discussed in greater detail below, in one embodiment, the conductive element may be a coating on top of an internal non-conductive structural rod that supplies structural strength. In another embodiment, the internal rod may be hollow and the conductive layer may be coated on the inside of the hollow rod. In most embodiments of the invention, conductive element 8 is metallic, e.g., contains or made up of silver, copper, gold, aluminum (including aluminum alloys), nickel, steel (including stainless steel), chromium, beryllium or tungsten or the like. In certain embodiments, a non-metallic material, e.g., carbon graphite, may be used. In general, the conductivity required depends on the acceptable level of RF voltage sag caused by the finite resistance between the RF attachment points and the rod to rod and rod to enclosure capacitance. In general, with solid metal rods, this RF sag is not significant. At high multipole frequencies the depth of the resistive layer (as described below) may be considered, but in general the capacitive voltage drop through the insulating layer and the voltage drop coupling through the thin resistive layer will have a greater effect on the delivered RF voltage to the surface of the rod.

Insulative element 6 surrounds and insulates conductive element 8 from resistive element 4 when a potential difference is applied thereto. The insulative element of a rod is typically made using a product of dielectric strength and thickness greater then the highest voltage difference between the conductive layer and the resistive layer. The highest voltage difference is the sum of the DC difference and the RF difference which exists due to the finite capacitance of the insulation layer. Depending on the embodiment used, the highest voltage difference may be as low as 0.1 volt, as high as 100 volts, or any voltage in between 0.1 and 100 volts. As is described in greater detail below, insulative element 6 may be made from any one or more of a large number of suitable insulating materials. In general, insulative element 6 is typically a thin layer having a thickness in the range of 1 μm to 1000 μm, e.g., 5 μm to 50 μm having sufficient dielectric strength for the voltage difference employed. Typical insulation materials range in dielectric strength from 100-2000 volts per thousandths of an inch although insulation materials having dielectric strengths outside of this range are readily employed.

Insulative element 6 may contain any one or more of a wide variety of insulators, including polyamide, e.g., KEPTON®, acetal resin, e.g., DELRIN™, floropolymer e.g., KYNAR™, polycarbonate, e.g., LEXAN™, polystyrene, polytetrafluoroethylene, e.g., TEFLON™, Per-Flouro-Alkoxy (Teflon PFA™) or polyvinylchloride. In certain embodiments, insulative element 6 may be ceramic (e.g., a porcelain or porcelain enamel) or ceramic-like, e.g., beryllium oxide, or some other refractory-type material.

In certain embodiments, a metal oxide, e.g., an oxide of a conductive metal may be used as an insulative material in the rod. Therefore, in certain embodiments, oxidizing the surface of an inner conductive metal can produce the insulation layer. If the inner conductive metal is aluminum, this process is well known in the art and is known as anodizing. In general, methods for coating a conductive material with an insulative layer are well known in the art, and have been successfully employed in a variety of other electrical, e.g., semiconductor, arts, for example. In certain embodiments, methods employed in semiconductor heat sink arts may be employed for producing the rod.

Since the RF voltage drop from the conductive element through the insulating element to the resistive element is almost proportional to the thickness of the insulating layer, a thin layer of material is desirable to save power and deliver the highest possible voltage to the outside of the rod. Since the capacitance across this insulative layer increases with dielectric constant, a higher dielectric constant also reduces the RF voltage drop with the same benefits as the thinner layer already mentioned. For the above two reasons, anodization is a particularly advantageous embodiment, as thin layers can be created and the dielectric constant is higher than organic insulation materials.

Resistive element 4 is typically a resistive coating upon insulative element 6 and may be present on the outside surface of the rod. The insulation and resistive layers do not need to go all the way around the rod, but can be limited to the surface of the rod which influences the ion beam. Nevertheless, the embodiments, calculations, and figures herein will assume that the insulation and resistive layer cover the full circumference of the rods. Typical considerations such as cost, manufacturability and reliability apply to the design of the resistive layer. In addition there are five additional criteria that may be considered in specifying the thickness of the resistive element and the material from which that element may be made: 1) During operation of the multipole device, stray or ejected ions may strike the rods of the device, potentially causing local voltage perturbations that disturb ions of interest. If this is the case, a low resistivity material and/or a thicker resistive element may be employed. 2) During operation of the multipole device, the RF voltage drop across the resistive element may be high. If this is the case, a low resistivity and/or a thinner resistive element may be employed. 3) During operation of the multipole device, the RF power loss may cause excessive heating of the rods of the device, particularly if the rods are in a vacuum. If this is the case, then a low resistivity material and/or a thinner resistive element may be employed. 4) During operation of the multipole device, the DC current requirements, while less for this invention than for a non-distributed capacitance design, may still be higher than desired. If this is the case, then a thinner resistive element and/or higher resistivity material may be employed, assuming that a fixed end-to-end DC gradient is desired. 5) During operation of the multipole device, the DC power dissipation may heat the rods of the device. If this is the case, a small thickness layer with higher resistivity may be employed. Interestingly, if the rods are circular, the cross-over when the DC power dissipation is equal to the RF power dissipation occurs when the product of the rms RF current (for one rod) times the resistivity equals the product of the DC end-to-end voltage times the rod circumference. Hence, the relative importance of criteria 3 or 5 depends on the embodiment, specifically on the RF circulating currents, the rod diameter, the applied DC, and the resistivity of the chosen material.

The resistive element 4 may have a resistivity of 5 Ohms/square to 10 MOhms/square, e.g., 100 Ohms/square to 1 MOhms/square or 10 kOhms/square to 50 kOhms/square and, in certain embodiments may comprise, for example, one or more of a resistive ink, a metallic oxide, metallic oxide with glass, metal foil, metal wire windings, conductive plastic, or the like. In many embodiments, an insulative element 6 is coated in a layer of resistive ink, which inks are well known in the art. Particular resistive inks of interest include carbon resistive inks (e.g., C-100 or C-200 or the like), cermet inks (containing a combination of fine ceramic or glass particles and precious metals), metallic inks, conductive plastic inks and polymer inks. Carbon resistive inks are particularly employable when a ceramic insulative material is present in the rod, although in particular embodiments, a ceramic insulative material may be coated (e.g., glazed) to provide to provide a desired resistive material on the outside of the ceramic insulative material.

Resistive inks that do not oxidize on surfaces may be employed in the rods, and, accordingly, potentiometer inks are readily employed. Suitable resistive inks may be purchased from Metec Inc. (Elverson, Pa.) and others.

In one embodiment, the rod may contain: a) an inner metallic (e.g., aluminum) central core, b) an intermediate insulative layer produced by oxidizing the surface of the inner metallic core, and c) an outer layer of resistive ink upon the intermediate insulative layer. In another embodiment, the rod may contain: a) an inner ceramic core (e.g., an internal ceramic rod), b) a layer of conductive material upon the ceramic core, c) an intermediate insulative layer upon the layer of conductive material, and d) an outer layer of resistive ink upon the intermediate insulative layer. In one other embodiment, the rod may contain: a) an inner metallic central core, b) an intermediate insulative ceramic layer, and c) an outer layer of resistive ink (e.g., a cabon-based ink) upon the intermediate insulative ceramic layer.

As mentioned above, the rod may contain insulative and resistive elements along at least part of its length (including, but not necessarily, the entire length of the rod). The part of the length of a rod that has the insulative and resistive elements may be at the beginning, end, both the beginning and end, or in the middle of the rod. In certain embodiments, at least 3%, at least 10%, at least 25%, at least 50%, or at least 90% of the rod, typically up to 10%, up to 25%, up to 50%, up to 80% or 100% of the length of the rod contains both the insulative and resistive elements.

In certain embodiments, the resistive material may be on the surface of the rod (i.e., not covered in other materials) and may be present as a layer that has a thickness of 0.1 μm to 1 mm, e.g., 5 μm to 100 μm.

As mentioned above, the rods may be electrically connected so as to provide a direct current (DC) electric field gradient along said central axis for moving said ions along said axis and a radio frequency field that confines said ions to said axis. Accordingly, in certain embodiments of the invention, the multipole device may be connected to an RF voltage source for supplying an RF voltage and a DC voltage source for supplying a DC voltage.

Figure 3:
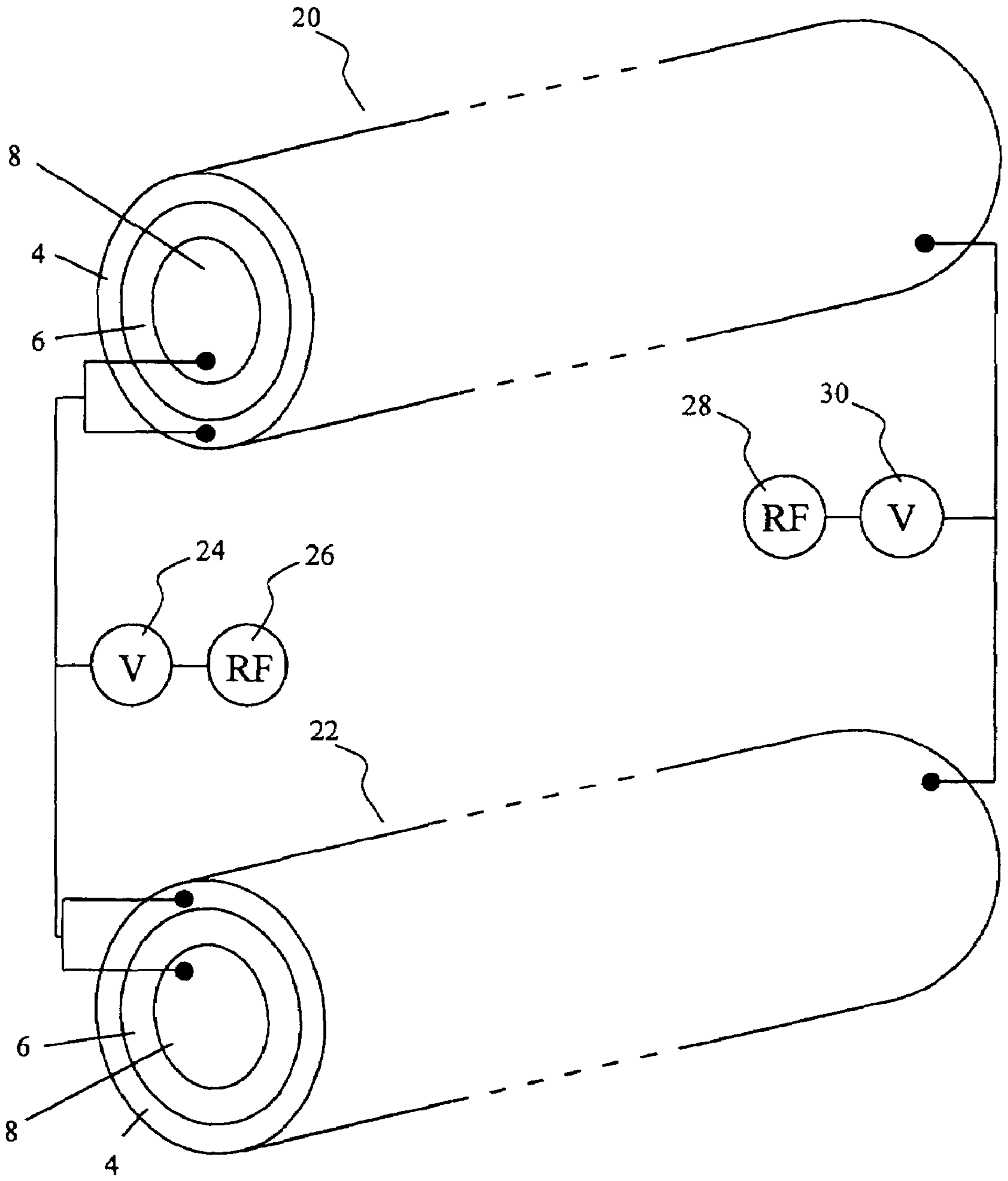
FIG. 3 is a schematic representation showing electrical connections between even-numbered or odd-numbered rods of the multipole ion guide.
Figure 4A:
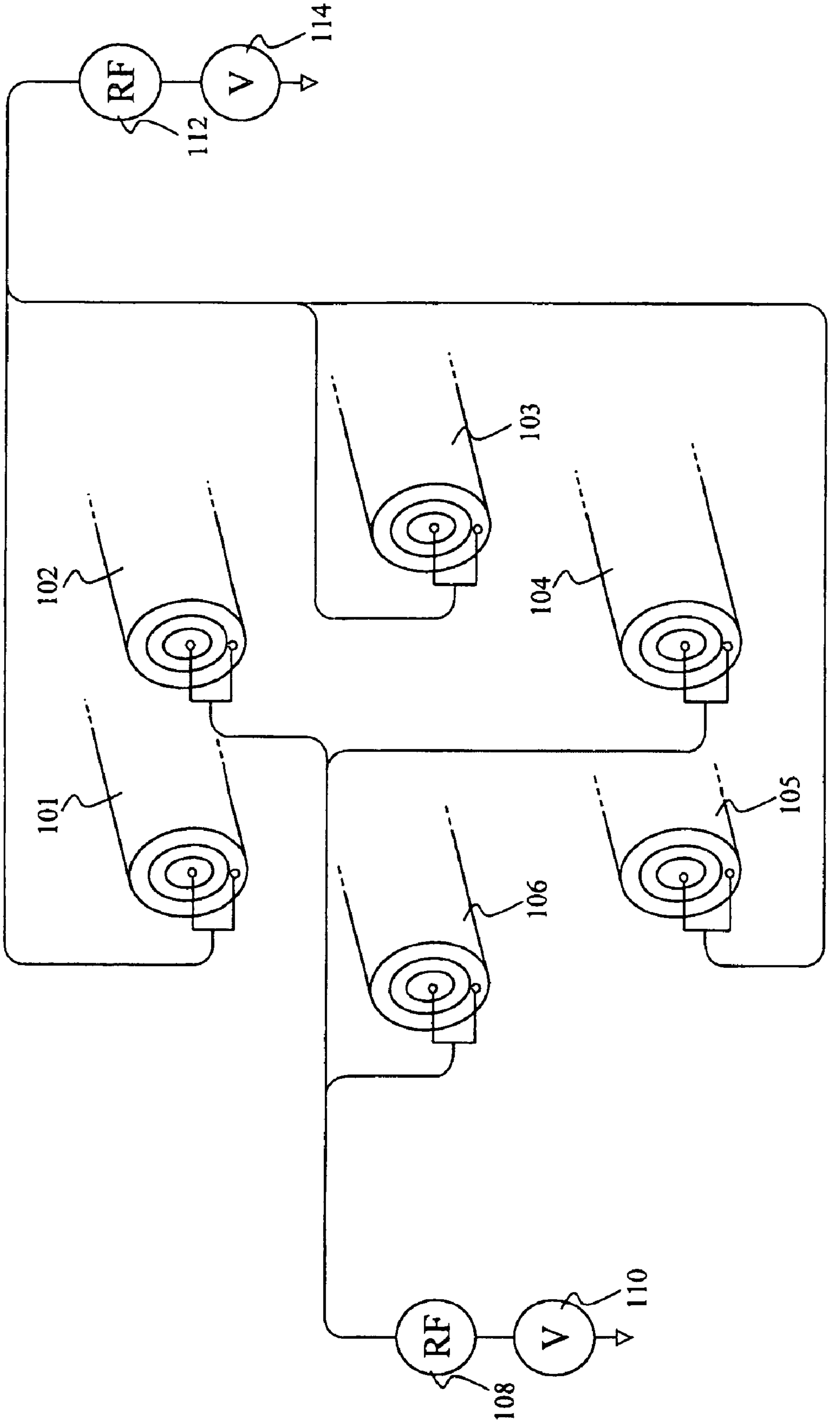
FIGS. 4A and 4B is a schematic representation showing electrical connections between rods at the ion input end (FIG. 4A) and the ion output end (FIG. 4B) of an exemplary hexapole ion guide of the invention.
Figure 4B:
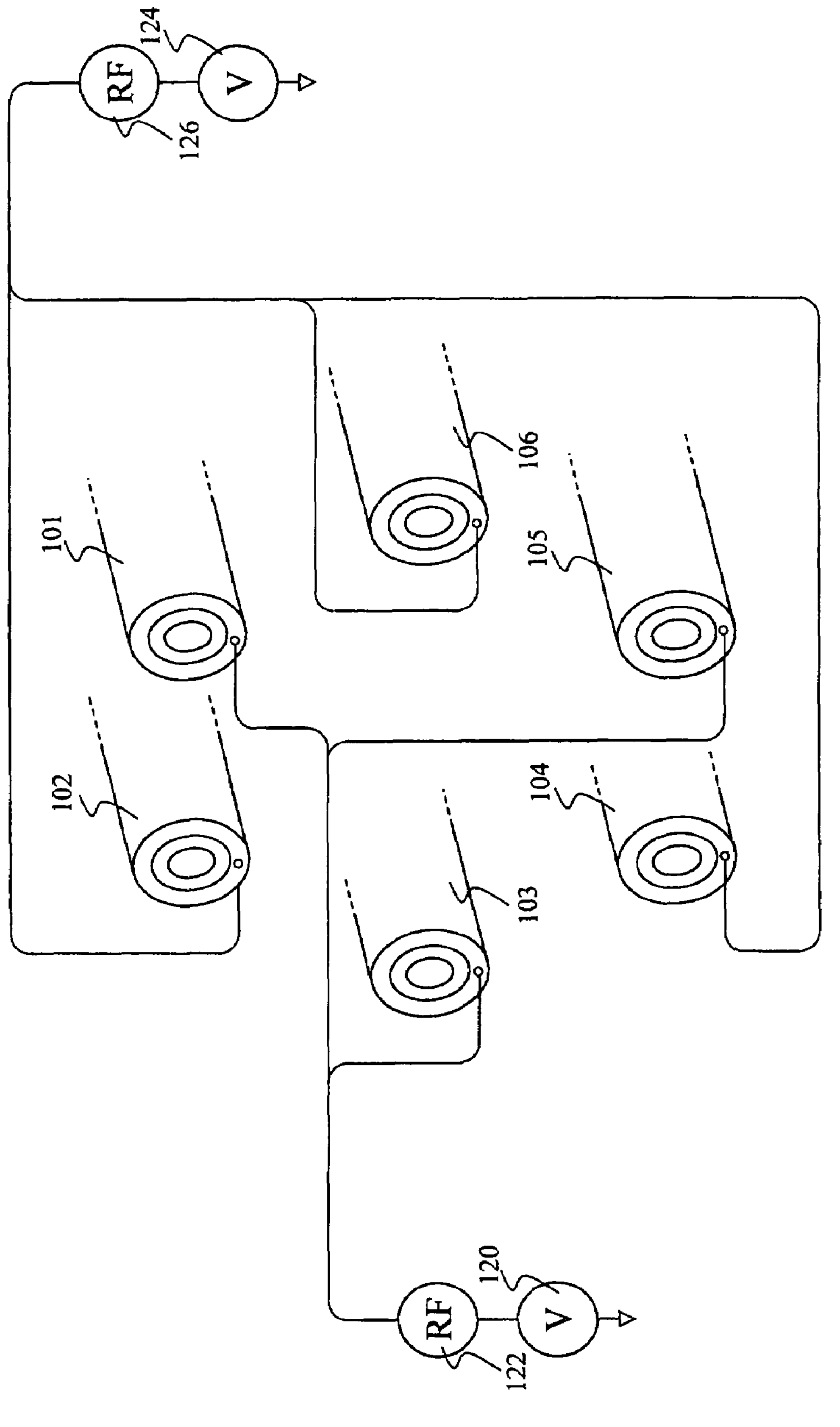

As mentioned above, a rod of the device may be arbitrarily labeled an odd-numbered rod or an even-numbered rod, depending on its position relative to other rods of the device. Exemplary electrical connections of rods of the device are shown in FIGS. 3, 4A and 4B. FIG. 3 shows exemplary electrical connections between rods 20 and 22. Rods 20 and 22 are any two odd-numbered rods (e.g., rods numbered 1, 3, 5 or 7), or any two even-numbered rods (e.g., rods numbered 2, 4, 6 or 8) in the device. In many embodiments, the resistive element 4 and the conductive element 8 of a rod are electrically connected with each other at one end of the rod. Resistive elements 4 and conductive elements 8 of each of the odd-numbered rods are connected at the same end to the same DC source 24 and the same RF source 26, and resistive elements 4 and conductive elements 8 of each of the even-numbered rods are connected at the same end to the DC source 24 and the same RF source 26. The resistive element 4 and conductive element 8 are typically connected to the same DC source 24 and the same RF source 26 at the ion input end of the rods, although such a connection may occur at the other end of the rods (i.e., the ion output end of the rods) in certain embodiments. Resistive element 4 and not conductive element 8 of each rod is connected to DC source 30 and RF source 28 at the other end of each rod. DC sources 24 and 30 typically supply different DC voltages to the ends of the rods (having a difference of 0.3-50V, e.g., 0.8-12V, or greater, for example), thereby providing a voltage gradient along the rod. The RF voltage supplied to the ends of each even-numbered rod by RF sources 26 and 28 is typically in phase, and the RF voltage supplied to the ends of each odd-numbered rods by RF sources 26 and 28 is typically in phase. As is known for other multipole devices, the RF voltages supplied to the odd-numbered rods may be 180 degrees out of phase with that supplied to the even numbered rods.

FIG. 4A schematically shows the electrical connections of the ends of rods 101, 102, 103, 104, 105 and 106 at one end (e.g., the ion input end) of an exemplary multipole device. In this example, the set of even number rods 102, 104 and 106 is driven by an RF voltage having a first magnitude supplied by an RF source 108 and a DC voltage having a first value supplied by a DC source 110. A second RF voltage having a second magnitude and a second DC voltage having a second value are supplied by a second RF source 112 and a second DC source 114, respectively, and supplied to the set of odd number rods 101, 103 and 105. The first and second DC voltage values and/or the first and second RF voltages magnitudes supplied may be the same or different, while the phase of the RF voltages from RF source 108 may be 180 degrees out of phase with that of RF source 112. Note that the conductive elements and resistive elements of all rods are electrically connected to the DC and RF sources in FIG. 4A. As would be recognized by one of skill in the art, the conductive elements and resistive elements at the end of a rod may be electrically connected by a variety of methods, including by coating (e.g., metallizing) the end of a rod and connecting the coated end of the rod to a power supply via a single wire, or by connecting each of the conductive and resistive elements to different wires that may be joined together prior to connection to a power supply.

FIG. 4B schematically shows the electrical connections of the ends of rods 101, 102, 103, 104, 105 and 106 at the other end (e.g., the ion output end) of an exemplary multipole device. These rods are shown in “reverse” order as compared to FIG. 4A since the device of FIG. 4B is viewed from the opposite side to that shown in FIG. 4A. In this example, the set of even number rods 102, 104 and 106 is driven by an RF voltage having a first magnitude supplied by an RF source 126 and a DC voltage having a first value supplied by a DC source 124. A second RF voltage having a second magnitude and a second DC voltage having a second value are supplied by a second RF source 122 and a second DC source 120, respectively, and supplied to the set of odd number rods 101, 103 and 105. The first and second DC voltage values and/or the first and second RF voltages magnitudes supplied may be the same or different, while the phase of the RF voltages from RF source 122 may be 180 degrees out of phase with that of RF source 126. Note that only the resistive elements are electrically connected to the DC and RF sources in FIG. 4B.

The value of the DC voltage supplied to the ends of each of the rods at one end of the device is typically the same, and the value of the DC voltage supplied to the ends of each of the rods at the other end of the device is typically the same. However, as discussed above, the DC voltage value supplied to the ends of each of the rods of the device typically differs from that supplied to the ends of each of the rods at the other end of the device to provide a DC gradient that moves ions in a direction parallel to the axis of the device. Depending on the type of ion being transported, the DC voltage may be higher or lower at the ion input end of the device, as compared to the DC voltage at the ion output end of the device.

The magnitude of the RF voltage supplied to the ends of each of the rods at one end of the device is typically the same (although out of phase for consecutive rod), and the magnitude of the RF voltage supplied to the ends of each of the rods at the other end of the device is typically the same (although out of phase for every consecutive rod). The magnitudes of the RF voltages supplied to the ends of each of the rods at one end of the device may differ or may be the same as those supplied to the ends of each of the rods at the other end of the device to provide an RF for confining ions to a central axis region.

As would be recognized by one of skill in the art, a wide variety of DC gradients and RFs may be employed in the device to produce an electromotive force for moving ions down the axis of the device. In certain embodiments, a DC gradient of 0.3-50 volts (e.g., 0.8-15 volts or about 10 volts) may be employed, although gradients well outside of this range are easily envisioned. If fragmentation of ions in the multipole is desired, voltages up to 300 volts may be employed. If it is desirable to contain the ions inside the multipole for an extended period of time, either to increase the collisional cooling, or to store the ions and gate them out to match a pulsed detector, such as a time of flight analyzer, the DC gradient can be periodically reversed and/or its level adjusted. In general, an ion-confining RF produced in the device typically has a frequency of 0.1 MHz to 10 MHz, e.g., 0.5 MHz to 5 MHz, and a magnitude of 20V to 10000V peak-to-peak, e.g., 400V to 800V peak to peak.

As would also be recognized by one of skill in the art, the outer resistive element of the rod may optionally contain electrode taps, typically connected using a metal (e.g., palladium silver) band around the outside of the rod at one or more positions of the rod. Varying the voltage of the electrode taps may isolate and/or release ions at a particular region of the device as they traverse the ion guide.

The particular arrangement of elements in each of the rods described here provides a multipole device that is not subject to RF droop as compared to other prior art devices. As such, the device represents a significant contribution to the mass spectrometry arts. The multipole device finds particular use in applications in which larger DC voltage gradients (e.g. applications in which the voltage gradient is 5-20V, for example) are employed. In such applications, surface coatings with a high resistance may be employed.

The invention also provides methods in which the multipole device is employed to move an ion. In general, the methods involve introducing ions to an input end of a multipole device, and providing an RF field and a DC gradient suitable to confine and directionally move ions along the central axis of the device. As discussed above, a neutral gas may be provided to the device in order to fragment ions as they move through the device. In certain embodiments, the potential gradient along the rods of the device may be increased to eject ions out of the device so they approach the output end of the device and are elected therefrom.

The methods of moving an ion may be employed in a method of analyzing an ion. In general, this method involves transporting an ion in the multipole ion guide, and detecting the mass of the ion. Since the RF drop along the rod can be minimized, in addition to its application in an ion transport device, an ion storage device, and a collision cell, distributed capacitance coupling to a resistive surface could be used in a quadrupole mass analyzer to generate axial fields. Such an embodiment could enable a mass filter quadrupole structure to also perform as a collision cell and/or as a storage device. With appropriate DC taps, e.g., adding taps to the middle of the rods, a quadrupole mass filter constructed as described above could actively control the axial energy, and thereby either slow down, or trap ions in various locations along the length of the device, facilitating higher resolution or pulsed ejection.

EXPERIMENTAL

The following examples are put forth so as to provide those of ordinary skill in the art with a description of how to make and use some embodiments of the present invention, and are not intended to limit the scope of what the inventors regard as their invention.

Example 1

Although countless embodiments are possible, this example describes a collision cell comprising a hexapole with aluminum rods of diameter 2.54 mm, a 2R0 of 4.4 mm, and a device length of 150 mm. In this example, 4 volts DC is applied from end to end and a stray ion current of 33 nanoamps is assumed to strike the center area of each rod. A maximum center rod deviation of 0.1 volt is set as one criteria, which results in a calculated maximum end to end resistance of 12 Mega Ohms. The end to end rod resistance is the product of the resistivity times the length divided by the circumference and the thickness. If we use a resistive potentiometer ink from Lord/METECH with a finished cured thickness of 16 microns, then the resistivity should be <1.02 kOhm/cm. Dividing by 0.0016 cm suggests a resistivity of <637 kOhm per square. The rod-set to rod-set capacitance of a similar hexapole measured 50 pf. This is equivalent for our purposes to a 33 pf capacitance to virtual ground for each rod. The desired RF voltage is 300 Volt peak on the rod. A frequency of 4.5 Mhz was used in these calculations. The peak current into the rod is then (300)(2)(pi)(4.5e6)(33e-12)=0.28 amp and the RMS current is 0.2 amp. If we require the RF power dissipated in the insulating layer to be less than 0.05 watts, and if we approximate that the RF current is concentrated in ¼ of the circumference, i.e. mostly facing the adjacent rods, then the resistivity should be <(0.05)(pi)(0.254)(150)/((0.2)(0.2)(0.016)(4)) or <2.34 kOhm-cm. Hence the RF power loss specification is less restrictive than the stray ion dissipation criteria in this embodiment. A check of the worst case RF voltage drop across the resistive element even if a high resistivity of 2.34 kOhm-cm is used results in a value of (1.414)

(0.05)/0.2=0.35 volts. This is quite acceptable for this embodiment and will only decrease when we pick lower values of resistivity.

If we limit the DC power loss to 0.05 Watts the resistivity needs to be >(4)(4)(pi)(0.254)(0.016)/((0.05)(150)) or >0.027 Ohm-CM. A more limiting criteria in this embodiment would be the desire to keep the total ion current for 6 rods to be less than 6 milliamp so that an inexpensive voltage driver can be used. A requirement of <1 ma per rod means the resistivity must be >0.34 Ohm-cm. So the resistivity can be selected in a range from range of 0.34 Ohm-cm to 1000 Ohm-cm and still meet all of the device requirements. This illustrates one of the advantages of coaxial coupling to a resistive surface. Compared to non-distributed capacitance designs there is a much larger range of acceptable resistive material properties and variations in the resistance value are of less consequence to the performance of the device, i.e. the design sweet-spot is quite large. In this embodiment we could choose to use 1000 Ohm/square potentiometer ink from Lord/Metech which can give a 16 micron thick coat of 2.5 Ohm-cm.

Prior to applying the resistive film, the aluminum is anodized to supply the insulation layer. We can choose to use an anodizing thickness of 10 microns (or 0.001 cm). Much thinner would be quite sufficient since the dielectric strength of typical anodized layers ranges from 40 to 80 volts per micron. However, the thicker layer could have advantages with corrosion resistance in case the parts are stored in a moist or corrosive environment between the anodizing and resistive coating steps. The relative dielectric constant typically ranges from 6 to 8 for various aluminum anodization processes and we will use a value of 7 for our calculation. Again, estimating that the peak RF current of 0.28 amp is focused in ¼ of the circumference, the effective total distributed capacitance is about 8.54(pi)(0.254)(0.150)(7)/(4(0.001))=1790 pf. The RF voltage drop across the anodized layer is then 0.28/(2(pi)(4.5e6)(1790e-12))=5.5 volts. This is quite acceptable in this application. The RF voltage drive circuits then need to produce about 306 volts to deliver 300 to the surface of the rods. It is clear that some variation in the insulation thickness, either from rod to rod, or even along an individual rod would be acceptable in this application as an ion guide or collision cell.

Example 2

This embodiment comprises a quadrupole mass filter constructed with coaxial distributed capacitance. The rods, perhaps with hyperbolic faces, can be approximated as 0.8 cm diameter round rods of a length of 0.2 m. The length could perhaps be reduced if the ions are slowed down in the center by the applying a dc voltage to a center tap point. The rods would have to be biased to the U+ and U− voltages. We will assume a 10V end to end voltage although numerous combinations of voltages along the length are possible. If the rods could be made out of aluminum, a thinner anodization layer should be specified, e.g., less than a micron. The thinner layer decreases the RF voltage drop so that variations in layer thickness do not cause RF voltage variations on the outside surface of the rods, leading to field aberrations and poor ion mass-filtering. Sub-micron anodized aluminum layers are common in electrolytic capacitors.

The RF voltage drop through the resistive layer is insignificant if we use the previously suggested 2.5 Ohm-cm resistivity 16 micron potentiometer ink. However, it is probably not prudent to have a 16 micron thick resistive layer since variations in that thickness would change the 2r0 of the quadrupole and degrade peak shape. A thinner resistive layer with a uniformity thickness would be preferable. One possibility is to apply a 50 nm layer of titanium-nitride using CVD. If the conductivity of the layer is 400 uOhm-cm, then the DC current would be (10)(pi)(0.8)(50e-9)/((400e-6)(0.2))=15 milliamp and the DC power lost in the rod would be 0.15 watt. These are not unreasonable numbers for a quadrupole mass filter if axial fields are desired.

It is evident from the above results and discussion that the invention provides an important new apparatus for guiding ions. Accordingly, the present invention represents a significant contribution to the art.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A multipole device, comprising:

a plurality of rods, each rod having at least first and second elements, the first element being electrically isolated from the second element along at least a portion of each of said rods; and a power supply in electrical communication with the plurality of rods, so as to supply a radio frequency (RF) signal to the first element of each of the rods and to supply an RF signal and direct current (DC) signal to the second element of each of the rods.

2. The multipole device of claim 1, wherein said plurality of rods are electrically connected so as to provide a direct current electric field gradient along an axis for moving said ions along said axis in a substantially uniform radio frequency field.

3. The multipole device of claim 1, wherein a conductive layer is interposed between the first element and the second element of each rod.

4. The multipole device of claim 3, wherein said first element and said second element are electrically connected at one end of each rod.

5. The multipole device of claim 1, wherein each of said rods comprise a central core.

6. The multipole device of claim 5, wherein said central core is a conductive layer.

7. The multipole device of claim 1, wherein said multipole device comprises 2, 4, 6, or 8 rods equally distanced from said axis.

8. The multipole device of claim 1, wherein said multipole device is a collision cell, mass filter, or ion guide.

9. The multipole device of claim 1, wherein said multipole device is arranged to provide an input end for accepting ions, an output end for ejecting ions, and a central axis extending from an input end to an output end.

10. The multipole device of claim 9, wherein said first element and said second element of every other rod are electrically connected to each other at said input end of said multipole ion guide.

11. A method comprising:

supplying a first element of each of a plurality of rods with a radio frequency (RF) signal; and supplying a second element of each of a plurality of rods with the RF signal and with a direct current (DC) signal, wherein the second element is electrically isolated from the first element along at least a portion of each of said rods.

12. The method of claim 11, further comprising: electrically connecting said plurality of rods so as to provide a direct current electric field gradient along an axis for moving said ions along said axis and a uniform radio frequency field.

13. The method of claim 11, further comprising: interposing a conductive layer between the first element and the second element of each rod.

14. The method of claim 13, further comprising electrically connecting said first element and said second element at one end of each rod.

15. The method of claim 11, wherein said rods comprise a central core, and wherein the act of biasing the first element comprises biasing the central core.

16. The method of claim 15, wherein said central core is a conductive layer, and wherein the act of biasing the central core comprises biasing the conductive layer.

17. The method of claim 11, further comprising arranging 2, 4, 6, or 8 rods in an equidistant relationship from said axis.

18. The method of claim 17, wherein said plurality of rods comprise a collision cell, mass filter, or ion guide.

19. The method of claim 17, further comprising arranging said rods to provide an input end for accepting ions, an output end for ejecting ions, and a central axis extending from the input end to the output end.

20. The method of claim 19, further comprising electrically connecting said first element and said second element of every other rod at said input end of a multipole ion guide.

21. A multipole device, comprising:

a first rod having at least first and second elements, the first element being electrically isolated from the second element along at least a portion of the first rod;

a second rod having at least first and second elements, the first element being electrically isolated from the second element along at least a portion of the second rod; and a power supply in electrical communication with the plurality of rods, so as to supply a radio frequency (RF) signal to the first element of the first and second rods and to supply an RF signal and direct current (DC) signal to the second element of the first and second rods.

22. The multipole device of claim 21, wherein the first and second rods are arranged to provide an input end for accepting ions, an output end for ejecting ions, and a central axis extending from an input end to an output end.

23. A mass spectrometer, comprising:

an ion source;

a detector; and a multipole device interposed between the ion source and the detector, wherein the multipole device comprises a plurality of rods, each rod having at least first and second elements, the first element being electrically isolated from the second element along at least a portion of each of said rods; and a power supply in electrical communication with the plurality of rods, so as to supply a radio frequency (RF) signal to the first element of each of the rods and to supply an RF signal and direct current (DC) signal to the second element of each of the rods.

* * * * *